United States Patent [19]

Agostini et al.

[11] Patent Number: 5,843,190
[45] Date of Patent: Dec. 1, 1998

[54] HYPOCHLORITE BLEACHING COMPOSITIONS

[75] Inventors: Francesco Agostini, Milan; Andrea Agostini, Grottaferrata, both of Italy; Giuseppe Trigiante, Menlo Park, Calif.

[73] Assignee: The Procter & Gamble Company, Cincinnati, Ohio

[21] Appl. No.: 640,969

[22] PCT Filed: Nov. 4, 1994

[86] PCT No.: PCT/US94/12747

§ 371 Date: Jan. 17, 1997

§ 102(e) Date: Jan. 17, 1997

[87] PCT Pub. No.: WO95/13417

PCT Pub. Date: May 18, 1995

[30] Foreign Application Priority Data

| Nov. 11, 1993 | [EP] | European Pat. Off. | 93203153 |
| Feb. 22, 1994 | [EP] | European Pat. Off. | 94870033 |
| Jun. 24, 1994 | [EP] | European Pat. Off. | 94870103 |

[51] Int. Cl.$^6$ .................. D06L 3/06; D06L 3/08; D06L 3/16; C01B 11/06

[52] U.S. Cl. ............. 8/108.1; 252/186.36; 252/187.25

[58] Field of Search ............ 8/107, 108.1; 252/186.36, 252/187.24, 187.25, 187.26

[56] References Cited

U.S. PATENT DOCUMENTS

| 2,733,120 | 1/1956 | Robson et al. | 8/137 |
| 3,056,645 | 10/1962 | Anderson et al. | 8/109 |
| 4,120,650 | 10/1978 | Kapplen et al. | 8/109 |
| 4,235,732 | 11/1980 | Beyer | 252/103 |
| 4,554,091 | 11/1985 | Jones et al. | 252/187.25 |
| 4,772,414 | 9/1988 | Marzec et al. | 252/186.36 |
| 4,789,495 | 12/1988 | Cahall et al. | 252/187.25 |
| 4,801,396 | 1/1989 | Altenschöpfer et al. | 252/99 |
| 4,986,926 | 1/1991 | Hoffman . | |
| 5,055,219 | 10/1991 | Smith . | |
| 5,089,162 | 2/1992 | Rapisarda et al. | 252/187.24 |

FOREIGN PATENT DOCUMENTS

| 0 204 472 | 12/1986 | European Pat. Off. | C11D 1/75 |
| 0 295 093 | 12/1988 | European Pat. Off. | C11D 3/395 |
| 0 311 175 B1 | 4/1989 | European Pat. Off. | C11D 3/395 |
| 0 479 370 A2 | 4/1992 | European Pat. Off. | C11D 17/00 |
| 60055-100-A | 9/1983 | Japan | C11D 7/54 |
| 02014-298-A | 6/1988 | Japan | C11D 7/60 |
| 2 076 010 A | 11/1981 | United Kingdom | C11D 1/06 |
| WO 88/05461 | 7/1988 | WIPO | C11D 3/395 |

*Primary Examiner*—Joseph D. Anthony
*Attorney, Agent, or Firm*—Robert B. Aylor

[57] ABSTRACT

An aqueous liquid bleaching composition having improved fabric whitening and fabric safety performance, said composition consisting of an alkali metal hypochlorite, an alkali metal silicate, a strong source of alkalinity, and an alkali metal carbonate.

11 Claims, No Drawings

HYPOCHLORITE BLEACHING COMPOSITIONS

This application is a 35 U.S.C. 371 filing of PCT/US 94/12747, filed Nov. 4, 1994.

TECHNICAL FIELD

The present invention relates to a liquid bleaching composition which is suitable for laundry applications including hand washing as well as washing with automatic washing machines.

BACKGROUND OF THE INVENTION

Liquid bleaching compositions are well-known in the art. Amongst the different bleaching compositions available, those relying on bleaching by hypochlorite are often preferred, mainly for performance reasons. Representative of the art is, for example, WO-88-05461 which discloses an aqueous composition comprising hypochlorite, sodium carbonate and sodium hydroxide and the use of said composition for removing stains from the fabrics.

However, the drawbacks associated with the use of chlorine-based compositions are that said compositions may both damage and yellow the fabrics.

It is therefore an object of the present invention to provide a hypochlorite-containing composition, suitable for use in laundry, whereby the fabric whiteness is improved.

It is a further object of the present invention to provide a hypochlorite-containing composition, suitable for use in laundry, whereby fabric safety is improved.

We have now found that the previous objects can be met by formulating hypochlorite bleach compositions consisting of an alkali metal hypochlorite, an alkali metal salt of silicate, a strong source of alkalinity and optionally an alkali metal salt of carbonate. Said compositions allow to provide outstanding fabric whiteness as well as outstanding fabric safety on the fabrics treated therewith. In its broadest aspect, the present invention is based on the surprising finding that, for any given aqueous composition comprising an alkali metal hypochlorite, adding an alkali metal salt of silicate will improve both the fabric whiteness and the fabric safety on the fabrics treated therewith.

A further advantage of the compositions of the present invention is that on top of their outstanding whitening action and fabric safety properties said compositions allow also good stain removal, in particular enzymatic stain removal.

Compositions comprising hypochlorite, a carbonate salt, a silicate salt and a strong source of alkalinity have been described in the art. Co-pending European patent application number 93870070.5 discloses compositions comprising hypochlorite, sodium hydroxide, a bleach stable perfume and as a buffering system, sodium carbonate and/or sodium silicate.

EP-A-311 175 to Unilever discloses a liquid sanitizer composition comprising at least 2% by weight of a caustic agent such as sodium hydroxide, from 0 to 1% of a surfactant, at least 3% by weight of an alkali metal hypochlorite and an alkali metal neutral silicate. Sodium carbonate is not disclosed. The compositions disclosed in the '175 patent application are used in industrial machines for bulk warewashing or fabrics washing to ensure an acceptable level of hygiene. The compositions of the '175 patent application prevent decomposition of hypochlorite and corrosion by hypochlorite. J02014298 (abstract) discloses a cleaning composition for cleaning machine vessel comprising an aqueous solution of 0.5% to 15% by weight of hypochlorite and 3% to 30% by weight of silicate, preferably sodium silicate. Silicate is said to prevent decomposition of hypochlorite and corrosion by hypochlorite. Neither sodium hydroxide nor sodium carbonate are disclosed.

J60055100 (abstract) discloses hard-surface cleaners comprising from 1% to 10% by weight of hypochlorite, from 0.5% to 5% by weight of alkali metal hydroxide, preferably sodium hydroxide and from 0.5% to 8% by weight of an inorganic colloid such as amongst others Mg silicate. No sodium carbonate is disclosed.

The state of the art further comprises other documents disclosing more complicated fully formulated detergent compositions such as thickened compositions, or surfactant-based compositions, which may comprise hypochlorite, a strong source of alkalinity, carbonate salt and/or silicate salt amongst other ingredients, see for example EP-A479370, EP-A-295093, EP-A-75813, EP-A-204472 and GB-2076010. The compositions disclosed therein are in the field of dishwashing and/or in the field of hard-surface cleaning.

Actually, the benefits derivable from the use of an alkali metal salt of silicate in an aqueous bleaching composition comprising hypochlorite for bleaching fabrics, i.e. improved fabric whiteness and/or fabric safety on the fabrics treated therewith, have not been acknowledged in the prior art.

SUMMARY OF THE INVENTION

The present invention encompasses an aqueous liquid bleaching composition consisting of an alkali metal hypochlorite, or mixtures thereof, an alkali metal salt of silicate, or mixtures thereof, a strong source of alkalinity and from 0% to 5% by weight of the total composition of an alkali metal salt of carbonate, or mixtures thereof, with the provision that when said composition is free of said alkali metal salt of carbonate then said composition comprises less than 2% by weight of the total composition of said strong source of alkalinity and said alkali metal salt of silicate is not Mg silicate.

The present invention also encompasses a method of bleaching and washing fabrics which comprises the step of contacting said fabrics with an aqueous bleaching composition having a pH of from 9 to 14, said composition comprising an alkali metal hypochlorite, or mixtures thereof and an alkali metal salt of silicate, or mixtures thereof, said composition being free of a bleach stable perfume. In a preferred embodiment, the compositions used in said method further comprise an alkali metal salt of carbonate or mixtures thereof.

DETAILED DESCRIPTION OF THE INVENTION

The aqueous compositions of the present invention consist of the three following essential ingredients, in addition to one optional ingredient and water.

As a first essential ingredient, the compositions of the present invention comprise hypochlorite. Various forms of alkali metal hypochlorite are commercially available and, although this is not critical for the present invention, it is preferred herein to use sodium hypochlorite. Compositions according to the present invention comprise a bleaching amount of an alkali metal hypochlorite, or mixtures thereof, which typically represents from 2% to 10% by weight of the total composition, based on active chlorine, of said alkali metal hypochlorite. Preferred compositions herein comprise from 3% to 6%, based on active chlorine, of an alkali metal hypochlorite, or mixtures thereof.

As a second essential ingredient, the compositions according to the present invention comprise an alkali metal salt of silicate, or mixtures thereof. Preferred compositions herein comprise from 0.02% to 5% by weight of the total composition of an alkali metal salt of silicate, or mixtures thereof, preferably from 0.1% to 2% and more preferably from 0.2% to 1.6%. The preferred alkali metal salt of silicate to be used herein is sodium silicate. Silicate salts allow buffering of the pH of the present compositions. Indeed, silicate salts act as an effective buffer in very diluted conditions, e.g. when the dilution of a composition of the present invention in the wash solution in laundry application is up to about 8.5 g/l.

We speculate that the alkali metal salt of silicate in an aqueous composition comprising hypochlorite has a further action which allows to improve the fabric whiteness and the fabric safety of fabrics contacted with said composition. Indeed, said silicate salts allow to reduce or even eliminate the metal impurities both in said compositions as is and especially in the wash environment. Said metal impurities include heavy metal ions such as Cu, Fe, Ni, Co and the like, which have been found to adversely affect both fabric whiteness and fabric safety. This property is maximized by the presence of carbonate salts which remove from the wash solution magnesium and calcium which would otherwise bind to silicate salts.

Indeed, we believe that in the washing environment the metal ions catalyze the attack of hypochlorite on fabrics with the generation of yellow oxidized species. It is further speculated that said metal ions are adsorbed per se on oxidized fabrics as colored species and catalyze the degradation of the brighteners adsorbed on fabrics. Also said metal ions stabilize colored pigments of enzymatic stains such as blood and grass. Also metal ions catalyze the depolymerisation of cotton fibers which leads to reduced tensile strength of the fabrics, thereby reducing fabrics resistance.

As a third essential ingredient, the compositions according to the present invention comprise a strong source of alkalinity. Preferred compositions herein comprise less than 2% by weight of the total composition of said strong source of alkalinity, or mixtures thereof, preferably of from 0.04% to 1.5% and more preferably of from 0.1% to 0.9%. Examples of strong sources of alkalinity are alkali metal hydroxides, such as potassium and/or sodium hydroxide, or alkali metal oxides such as sodium and/or potassium oxide.

Accordingly, the compositions according to the present invention have a pH as is of from 9 to 14, preferably of from 9.5 to 13 and more preferably of from 9.5 to 12. It is in this alkaline range that the optimum stability and performance of the hypochlorite is obtained.

As an optional but highly preferred ingredient, the compositions of the present invention further comprise an alkali metal salt of carbonate, or mixtures thereof. Accordingly, the compositions herein comprise from 0% to 5% by weight of the total composition of an alkali metal salt of carbonate, or mixtures thereof, preferably from 0.1% to 4% and more preferably from 0.1% to 3%. The preferred alkali metal salt of carbonate to be used herein is sodium carbonate. Carbonate salts also allow buffering of the pH of the present compositions. In fact, said carbonate salts work as an effective buffer capable of restraining the pH drop coming from the dilution of a composition of the present invention in the wash solution in laundry application when said dilution is in the range of from about 9 to about 18 g/l. It is also suspected that the buffering of the hypochlorite compositions of the present invention reduces harshness to hands. Also, said carbonate salts act as a Ca/Mg precipitation system and thus remove from the wash solution calcium and magnesium.

Indeed, due to the combined action of silicate salts and carbonate salts, the pH of a composition according to the present invention remains constant throughout use, i.e. the pH of a diluted composition is buffered from the moment the dilution is completed and until said hypochlorite bleaching composition is started to be rinsed away from the fabrics to which it has previously been contacted. We speculate that the improvement in fabric safety is also due to the combined action of silicate salts and carbonate salts, which by their combined buffering action, reduce the conversion of hypochlorite into hypochlorous acid, the species which we have found to be the most responsible for the fabric damage.

The remainder of the compositions of the present invention is water, preferably, the water is present in levels from about 78% to about 98% by weigh of the total aqueous liquid bleaching composition.

The compositions of the present invention provide improved fabric whiteness as well as fabric safety. By "improved fabric whiteness" it is meant herein that the whiteness on fabric achieved by using the hypochlorite compositions of the present invention is improved compared to the whiteness obtained by using the same hypochlorite compositions but without any alkali metal salt of silicate. By "improved fabric safety" it is meant herein that the damage is caused on fabric by using the hypochlorite compositions of the present invention is reduced compared to the damage caused by using the same hypochlorite compositions but without any alkali metal salt of silicate.

The compositions according to the present invention are used in diluted form in laundry application. The expression "use in diluted form" herein includes dilution by the user, which occurs for instance in hand laundry applications, as well as dilution by other means, such as in a washing machine. Typical dilution levels are of from 0.4% to 20% for hand laundry application and 0.1% to 10% in a washing machine.

The present invention further encompasses a method of bleaching fabrics which comprises the step of contacting said fabrics with an aqueous bleaching composition having a pH of from 9 to 14 which comprises an alkali metal hypochlorite, or mixtures thereof and an alkali metal salt of silicate, or mixtures thereof, said composition being free of a bleach stable perfume. In a preferred embodiment, the compositions used in said method of bleaching fabrics may further comprise an alkali metal salt of carbonate. Said method according to the present invention improves the fabric whiteness and/or the fabric safety.

In the method of bleaching of the present invention, the compositions used may further comprise optional ingredients such as bleach-stable surfactants, organic or inorganic alkalis, pigments, dyes, optical brighteners, solvents, chelating agents, radical scavengers and the like.

More specifically, the method of bleaching fabrics according to the present invention comprises the steps of first contacting said fabrics with an aqueous bleaching composition having a pH of from 9 to 14 which comprises an alkali metal hypochlorite, or mixtures thereof, an alkali metal salt of silicate, or mixtures thereof, and from 0% to 5% by weight of the total composition of an alkali metal salt of carbonate or mixtures thereof, then allowing said fabrics to remain in contact with said composition, for a period of time sufficient to bleach said fabrics, typically 3 to 60 minutes, preferably 5 to 30 minutes, then rinsing said fabrics in water to remove said composition. If said fabrics are to be washed, i.e. with a conventional composition comprising at least one surface active agent, it is preferred to perform the method herein before said fabrics are washed. Indeed, it has been observed that bleaching said fabrics with the compositions according to the present invention prior to washing them with a detergent composition provides superior whiteness and stain removal with less energy and detergent than if said fabrics are washed first, then bleached. Accordingly, said method according to the present invention further comprises a subsequent step where said fabrics are washed with a detergent composition comprising at least one surface active agent.

The present invention will be further illustrated by the following examples.

EXPERIMENTAL DATA

The following compositions are made by mixing the listed ingredients in the listed proportions:

| Compositions (weight %) | 1 | 2 |
|---|---|---|
| Sodium hypochlorite | 5.0 | 5.0 |
| Sodium hydroxide | 0.7 | 0.7 |
| Sodium carbonate | 1.0 | 1.0 |
| Sodium silicate | — | 1.0 |
| Water | | 100% |
| pH | 13 | 13 |

Composition 1 is an hypochlorite-containing composition taken as a reference and commercially available. Composition 2 is representative of the present invention, i.e. composition 2 consists of sodium hypochlorite, sodium carbonate, sodium silicate, sodium hydroxide as the strong source of alkalinity and water.

1)

A handwash test has been carried out. The test was performed in a plastic basin. First 170 g of a composition of the present invention was diluted in 10 liters of tap water. From this solution samples of 500 g were taken and heated at 40° C. Then the tracers (white cotton fabric and stained tracers) were added into these samples. At the end of the washing cycle the tracers were rinsed and dried. Then the tracers were evaluated by visual grading.

The table below lists the results obtained for composition 2 versus composition 1.

| | Whiteness single | Enzymatic stain removal |
|---|---|---|
| Composition 2 vs. 1 | 1.5s | 0.5s |

Where:
  results are expressed on a 0 to 4 performance scale.
  S identifies statistically reproducible results.
Comments:
  The data clearly shows the unexpected whiteness improvement delivered by the aqueous compositions of the present invention consisting of sodium hypochlorite, sodium carbonate, sodium silicate and sodium hydroxide as the strong source of alkalinity (composition 2 versus composition 1). The data also shows that the compositions of the present invention also provide good enzymatic stain removal.

2)

A multicycle test in automatic washing machine has been carried out. A washing was performed in an automatic washing machine at 60° C. for 45 minutes with a washing solution comprising 8.5 g/l of a composition herein before mentioned. Then the tracers (white cotton fabric and stained tracers) together with ribbons were added into the washing solution. At the end of each washing cycle the tracers and ribbons were rinsed. After 15 washing cycles the damage on the fabrics was evaluated by puling said ribbons until they broke. The force necessary to break the ribbons was measured with an Instron tensilometer. The lower the force needed to break said ribbons, the more serious is the damage caused on the fabrics.

The results obtained were the following:
  65 Kg of tensile strength for a ribbon taken as a reference, i.e. a ribbon which has not been washed.
  25 Kg of tensile strength for a ribbon after 15 washing cycles when using composition 1.
  40 Kg of tensile strength for a ribbon after 15 washing cycles when using composition 2.
Comments:
  The data clearly shows the unexpected safety improvement delivered by the aqueous compositions of the present invention consisting of sodium hypochlorite, sodium carbonate, sodium silicate and sodium hydroxide as the strong source of alkalinity, as compared to a composition of the prior art (composition 1).

What is claimed is:

1. A method of bleaching fabrics to improve fabric whiteness and/or fabric safety which comprises the step of contacting said fabrics with a diluted aqueous bleaching composition at a concentration of from about 9 to about 18 grams per liter and a pH of from 9 to 14, said composition, in its undiluted form, comprising from 2% to 10% by weight of the total composition, based on active chlorine, of an alkali metal hypochlorite, or mixtures thereof, from 0.02% to 5% of an alkali metal silicate, or mixtures thereof, from 0.04% to 1.5% of a strong source of alkalinity and from 0.1% to 5% by weight of the total composition of an alkali metal salt of carbonate, or mixtures thereof, said composition being free of bleach stable perfume.

2. A method according to claim 1 wherein said bleaching composition is contacted to said fabrics in its diluted form.

3. A method according to claim 1 wherein said aqueous bleaching composition comprises from about 0.02% to about 2% by weight of the total composition of said alkali metal silicate.

4. A method of bleaching fabrics according to claim 3 which, after the step of contacting said fabrics with said bleaching composition, further comprises the steps of:
  allowing said fabrics to remain in contact with said bleaching composition for a period of time sufficient to bleach said fabrics,
  then rinsing said fabrics in water to remove said bleaching composition.

5. A method according to claim 4 which further comprises a subsequent step where said fabrics are washed with a detergent composition comprising at least one surface active agent.

6. An aqueous liquid bleaching composition consisting of from 2% to 10% by weight of the total composition, based on active chlorine, of an alkali metal hypochlorite, or mixtures thereof, from 0.02% to 5% of an alkali metal salt of silicate, or mixtures thereof, 0.04% to 1.5% of a strong source of alkalinity and from 0.1% to 5% by weight of the total composition of an alkali metal salt of carbonate, or mixtures thereof.

7. A composition according to claim 1 wherein said composition comprises from about 0.1% to about 2% by weight of the total composition of said alkali metal salt of silicate and wherein said alkali metal salt of silicate is sodium silicate.

8. A composition according to claim 1 wherein said composition comprises from about 0.2% to about 1.6% by weight of the total composition of said alkali metal salt of silicate and wherein said alkali metal salt of silicate is sodium silicate.

9. A composition according to claim 1 wherein said composition comprises from about 0.1% to about 3% by weight of the total composition of said alkali metal salt of carbonate and wherein said alkali metal salt of carbonate is sodium carbonate.

10. A composition according to claim 1 wherein said strong source of alkalinity is an alkali metal hydroxide, and wherein the pH is of from 9 to 14.

11. A composition according to claim 10 wherein said strong source of alkalinity is sodium hydroxide.

* * * * *